(12) United States Patent
Ishikawa

(10) Patent No.: US 6,526,849 B1
(45) Date of Patent: Mar. 4, 2003

(54) NEGATIVE DEFLECTION FLEXIBLE MESHING TYPE GEAR DEVICE HAVING PASSING TOOTH PROFILE WITH MAXIMIZED TOOTH HEIGHT

(75) Inventor: Shoichi Ishikawa, Kanagawa-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 75 days.

(21) Appl. No.: 09/714,110

(22) Filed: Nov. 17, 2000

(30) Foreign Application Priority Data

Nov. 22, 1999 (JP) .......................................... 11-330751

(51) Int. Cl.$^7$ ................................................ F16H 1/32
(52) U.S. Cl. ........................................ 74/640; 74/457
(58) Field of Search ......................... 74/640, 457, 460, 74/462

(56) References Cited

U.S. PATENT DOCUMENTS

| 2,828,542 A | | 4/1958 | Senkewitz | |
|---|---|---|---|---|
| 2,906,143 A | | 9/1959 | Musser | |
| 5,458,023 A | * | 10/1995 | Ishikawa et al. | 74/640 |
| 5,662,008 A | * | 9/1997 | Aubin et al. | 74/640 |
| 5,687,620 A | * | 11/1997 | Ishikawa | 74/462 |
| 5,782,143 A | * | 7/1998 | Ishikawa | 74/640 |
| 5,918,508 A | * | 7/1999 | Ishikawa | 475/180 |
| 6,167,783 B1 | * | 1/2001 | Ishikawa | 74/457 |
| 6,230,587 B1 | * | 5/2001 | Grill | 74/640 |

FOREIGN PATENT DOCUMENTS

| JP | 45-41171 | 12/1970 |
|---|---|---|
| JP | 05-332404 | 12/1993 |
| JP | 7-167228 | 7/1995 |

* cited by examiner

Primary Examiner—Ankur Parekh
(74) Attorney, Agent, or Firm—Burns, Doane, Swecker & Mathis, L.L.P.

(57) ABSTRACT

A flexible meshing type gear device includes a rigid internal gear, a flexible external gear and a wave generator, wherein the flexible external gear includes a cylindrical body and external teeth formed on the outer surface of the cylindrical body. The basic tooth profile of the flexible external gear having a flexing coefficient of smaller than 1 is given the shape of a convex arc, and a normal at the inflection point of the movement locus described by the center of the convex-arc tooth profile relative to the teeth of the rigid internal gear and an evolute of the locus are newly introduced, thereby clarifying the interference limit of the tooth profile and thus enabling maximization of the tooth height of the concave tooth profile portion of the rigid internal gear and the convex tooth profile portion of the flexible external gear.

5 Claims, 7 Drawing Sheets

(a)        (b)        (c)

NEGATIVE DEFLECTION FLEXIBLE MESHING TYPE GEAR DEVICE HAVING PASSING TOOTH PROFILE WITH MAXIMIZED TOOTH HEIGHT

BACKGROUND OF THE INVENTION

1. Field of the Invention

This invention relates to a flexible meshing type gear device of the type widely used in robot joints, semiconductor production equipment and the like, particularly to the shape of the teeth of a rigid internal gear and a flexible external gear used in the device.

2. Background Art

From the time of the invention of the flexible meshing type gear device by C. W. Musser (U.S. Pat. No. 2,906,143) up to the present, Musser and many other researchers, including the inventor of the invention described in this specification, have proposed various innovations. The variety of improvements in tooth profile proposed alone is considerable.

Regarding the tooth profile of the flexible meshing type gear device, the present inventor earlier proposed a tooth profile design method that uses rack-approximation of meshing between the teeth of the rigid internal gear and the flexible external gear to derive an addendum profile enabling wide range tooth meshing between the two gears (see JP-B 45-41171). The inventor also invented a method for avoiding tooth profile interference caused by rack approximation (JP-A 7-167228).

Specific tooth profiles developed by another include one that imparts an arc to the flexible external gear and uses the envelope curve of the arc as the tooth profile of the rigid internal gear (Japanese Patent No. 2,828,542). However, the efficacy of this invention is viewed as limited because use of an arcuate tooth profile was known earlier and the invention offers insufficient elucidation regarding the state of the envelope and other such interference issues.

There is a strong demand in the market for flexible meshing type gear devices that offer better performance. A particular need is felt for improvement in load capacity and prevention of tooth slipping (ratcheting) under excessive load condition.

Generally speaking, the main factors governing the load capacity of a flexible meshing type gear device are the rim strength of the flexible external gear tooth root and the strength of the rolling contact surface of the inner ring of the wave generator, particularly in the vicinity of the major axis. However, ability to resist ratcheting is closely related to tooth height.

An object of this invention is to enhance the load capacity of a flexible meshing type gear device by greatly enlarging the tooth height of the pass meshing profile, which is especially advantageous for increasing load capacity, and extending the overall tooth height without producing interference, thereby achieving higher ratcheting resistance, and by adopting negative deflection that reduces the amount of flexing of the flexible external gear and enables avoidance of meshing in the vicinity of the major axis where the bending stress of the tooth root rim is greatest.

SUMMARY OF THE INVENTION

The present invention achieves the foregoing object by giving the basic tooth profile of a flexible external gear having a flexing coefficient of smaller than 1 the shape of a convex arc and newly introducing a normal at the inflection point of the movement locus described by the center of the convex-arc tooth profile relative to the teeth of the rigid internal gear and an evolute of the locus, thereby clarifying the interference limit of the tooth profile and thus enabling maximization of the tooth height of the concave tooth profile portion of the rigid internal gear and the convex tooth profile portion of the flexible external gear, which perform main meshing, and maximization of the overall tooth height of the rigid internal gear without tooth profile interference.

Specifically,, the present invention relates to a flexible meshing type gear device having a rigid internal gear, a flexible external gear and a wave generator, wherein the flexible external gear includes a cylindrical body and external teeth formed on the outer surface of the cylindrical body, the wave generator flexes a cross-section of the external gear perpendicular to the gear axis into an elliptical shape to cause the external gear to mesh partially with the rigid internal gear, the rigid internal gear and the flexible external gear are both spur gears of module m, the number of teeth of the flexible external gear is 2n (n being a positive integer) fewer than the number of teeth of the rigid internal gear, and the wave generator is rotated to produce relative rotation between the two gears. The flexible meshing type gear device according to the present invention is characterized by the features set forth in the following.

A cross-section of the tooth trace of the flexible external gear perpendicular to the gear axis taken at an arbitrarily selected location is defined as a main cross-section. The difference at this main cross-section between the maximum radius of the neutral curve of the elliptical rim after deformation of the flexible external gear and the radius of the rim neutral curve before deformation is divided by mn. The result is defined as the flexing coefficient of the elliptical rim neutral curve. The flexing coefficient is set at a negative deflection smaller than a reference value of 1 to exclude the vicinity of the major axis of the ellipse from the meshing region of the teeth of the two gears.

The basic tooth profile of the flexible external gear is defined as a convex arc. The concave curve that the convex arc generates in the rigid internal gear is applied as the main portion of the tooth profile of rigid internal gear. The extreme point of the concave curve in the direction of the tooth crest is taken on a normal drawn at the inflection point of the movement locus described by the center of the convex arc tooth profile of the flexible external gear relative to the rigid internal gear. The point on the convex arc of the flexible external gear meshing with this extreme point is defined as the extreme point of the convex arc in the direction of the deddendum. The concave curve continuing on from the extreme point in the direction of the deddendum is applied as the deddendum of the flexible external gear.

The generated convex curve between the point on the normal drawn at the inflection point of the locus described by the center of the convex arc tooth profile of the flexible external gear and the return point of the generated curve appearing on the evolute of the locus is adopted as the tooth profile on the tooth crest side continuing on from the extreme point of the concave tooth profile of the rigid internal gear. A convex curve is further added to the generated convex curve without interfering with the flexible external gear.

In addition, the tooth crest point of the convex arc tooth profile of the flexible external gear is defined as the meshing point with the generated convex curve tooth profile of the rigid internal gear at the return point.

This configuration according to the present invention makes it possible to realize a flexible meshing type gear device with maximized tooth height wherein concave and convex tooth profiles effect pass meshing in the main cross-section of the flexible external gear apart from the major axis.

In addition to the ring-type flexible external gear composed of a cylindrical member having external teeth formed on its outer peripheral surface, there are also known cup-like and silk-hat-like flexible external gears. The flexible external gears of these shapes include a cylindrical body, an annular diaphragm continuous with one end of the body, an opening portion formed at the other end of the body, and external teeth for meshing with the aforesaid internal teeth formed on the outer peripheral surface of the body at the opening portion end. When this type of flexible external gear is used, the wave generator elliptically flexes cross-sections of the body of the flexible external gear so that the amount of flexing increases from the diaphragm toward the opening portion approximately in proportion to the distance from the diaphragm, thus partially meshing the external gear with the internal gear.

When necessary, relieving is applied to the teeth from the main cross-section of the flexible external gear toward the opening portion and toward the inner extremity continuing on from the diaphragm of the body.

It is also possible to eliminate meshing between the convex tooth profile of the rigid internal gear and the convex tooth profile of the flexible external gear by imparting clearance to the convex tooth profile of the rigid internal gear on the tooth crest side.

It is further possible to use the circle of curvature of the tooth profile at a typical point in the meshing region to approximate the generated convex tooth profile of the rigid internal gear.

DETAILED DESCRIPTION OF THE PREFERRED EMBODIMENT

An embodiment of the invention will be explained with reference to the drawings in which the difference in number of teeth between the rigid internal gear and the flexible external gear is 2n (n being a positive integer) and the shape of the rim neutral curve in the main cross-section of the flexible external gear is an approximated ellipse obtained by superimposing on a true circle of radius $r_n$ a sine wave having a total amplitude of 2k mn (k being a flexing coefficient and m being a module) and a wave length equal to one half the circumference.

Figure 1:
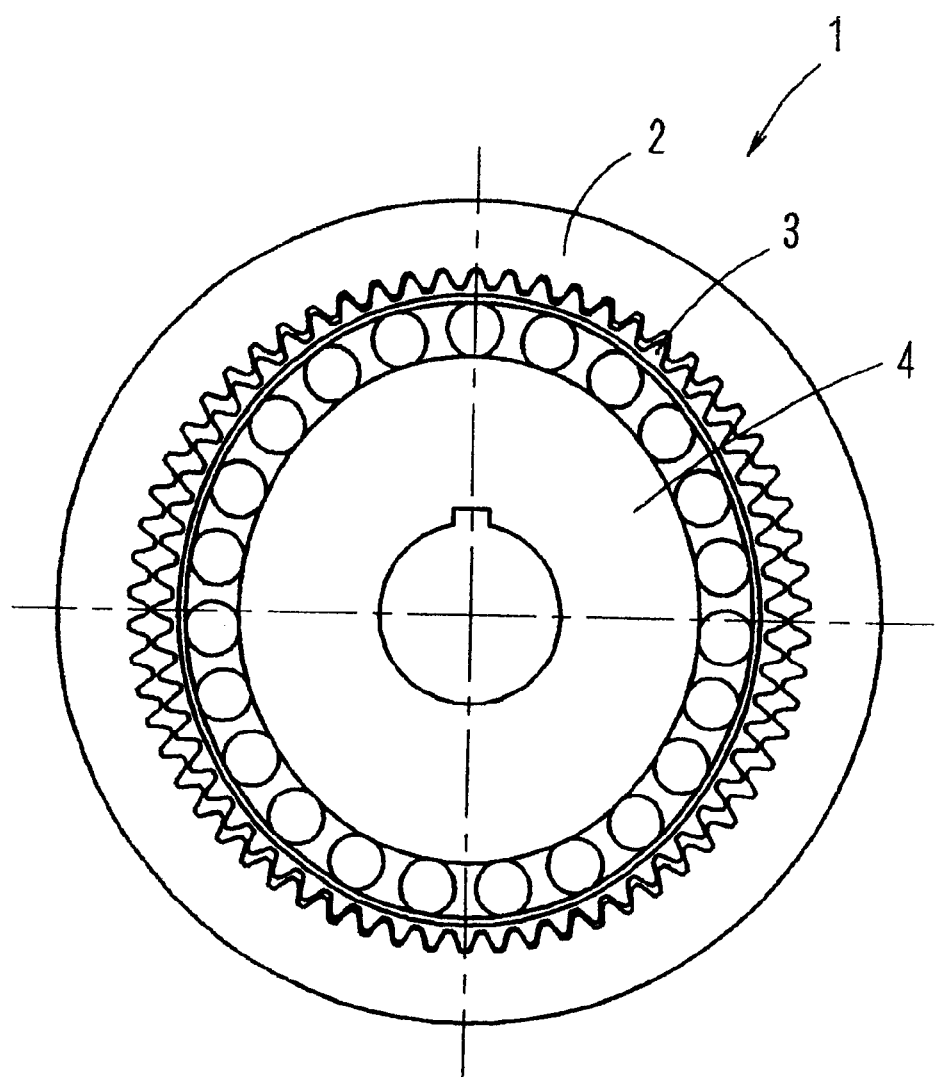
FIG. 1 is schematic front view of a typical flexible meshing type gear device.

FIG. 1 is a front view of a typical flexible meshing type gear device. As shown in this figure, the flexible meshing type gear device 1 has an annular rigid internal gear 2, a flexible external gear 3 disposed inside the rigid internal gear 2 and a wave generator 4 fitted inside the flexible external gear 3. The wave generator 4 has an elliptical profile. It flexes the external gear 3 into an elliptical shape to mesh the two gears partially at portions of the ellipse at opposite ends of its major axis.

Figure 2:
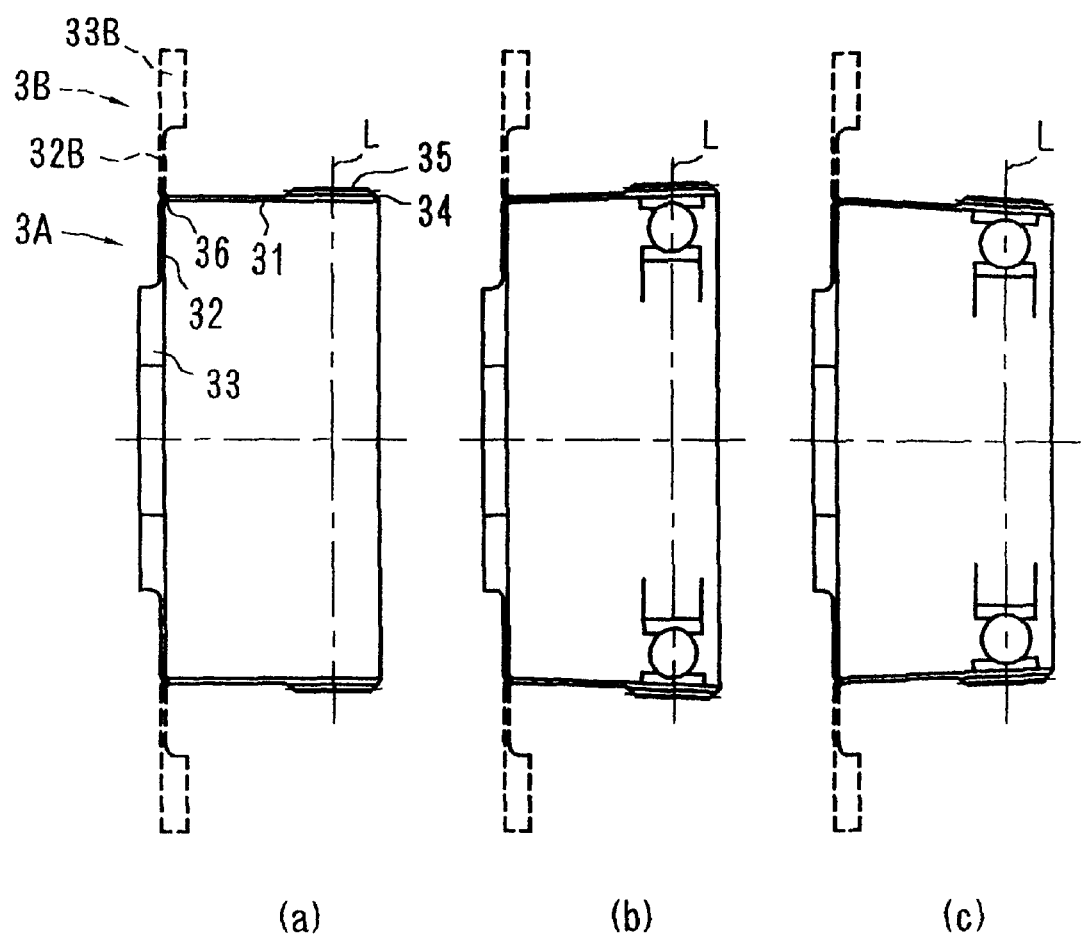
FIG. 2 is a set of diagrams for explaining how a cup-shaped or silk-hat-shaped flexible external gear is flexed, in which (a) is a section along the axis before deformation, (b) is a section including the major axis of the gear, and (c) is a section including the minor axis.

FIG. 2 is a set of diagrams showing sections of the flexible external gear taken through its axis. A cup-like flexible external gear 3A is indicated by solid lines and a silk-hat-like flexible external gear 3B is indicated by broken lines. In FIG. 2, (a) shows the shape before deformation, (b) is a section including the major axis of the elliptical curve, and (c) is a section including the minor axis. The lines marked L in the drawing indicate a section taken perpendicular to the axis as an example of the main cross-section.

The cup-like flexible external gear 3A comprises a cylindrical body 31, an annular diaphragm 32 formed continuously with one end of the cylindrical body to extend radially inward, an annular boss 33 formed continuously with the inner periphery of the diaphragm 32, and external teeth 35 formed on the outer periphery of the cylindrical body 31 on the side of the opening portion 34 thereof.

When the cylindrical body 31 of the elliptical wave generator 4 is fitted in from the side of the opening portion 34, the cylindrical body 31 is flexed into an elliptical shape such that the amount of flexing increases from the inner extremity 36 on the diaphragm side toward the opening portion 34 approximately in proportion to the distance from the diaphragm.

In the silk-hat-like flexible external gear 3B, the annular diaphragm 32B is formed to extend radially outward from the inner extremity 36 of the cylindrical body 31 and an annular boss 33B is formed continuously with the outer periphery thereof. In other structural aspects, the silk-hat-like flexible external gear 3B is the same as the cup-like flexible external gear 3A.

Figure 3:
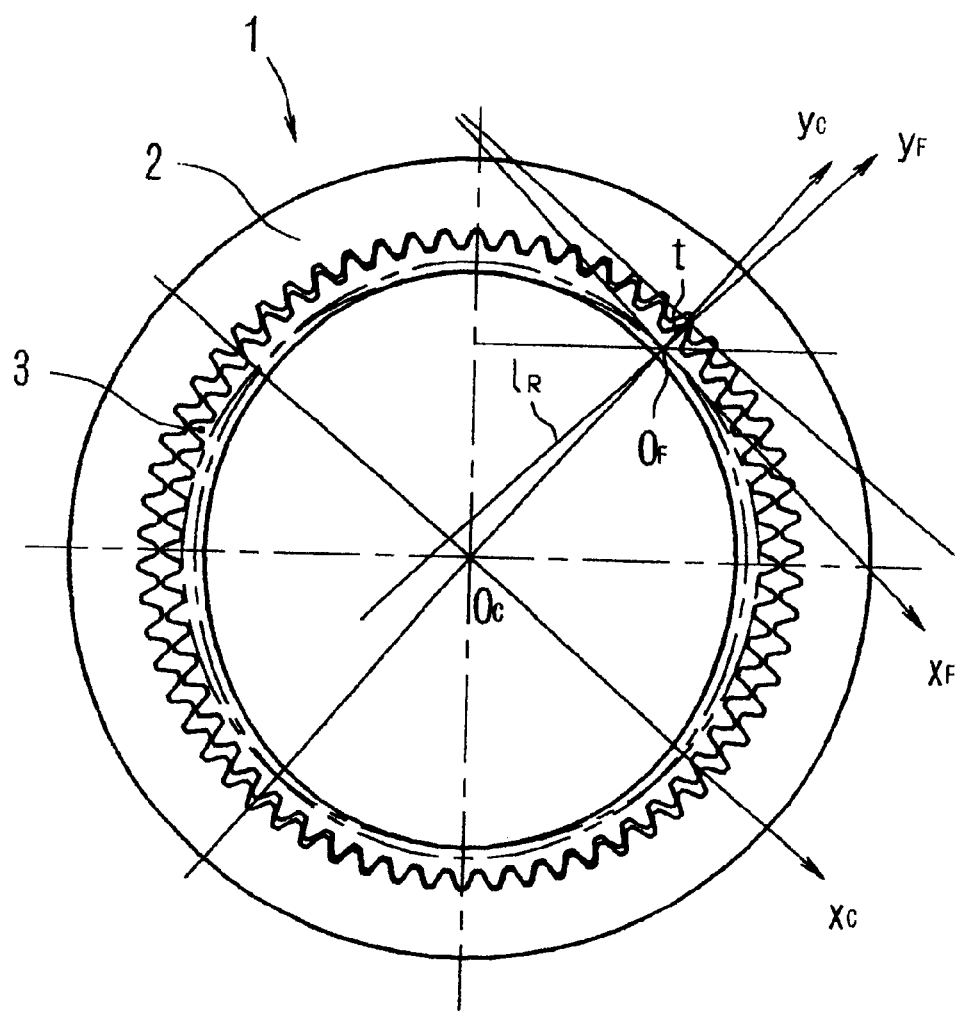
FIG. 3 is a diagram for explaining the relative positional relationship of meshing between a flexible external gear and a rigid internal gear.

FIG. 3 shows the relative movement between the gears 2 and 3 at the main cross-section that is the basis of tooth profile formation according to the present invention. On a tooth t of the flexible external gear 3, draw the axes $x_F$, $y_F$ of a coordinate system whose origin is the intersection point $O_F$ between the rim neutral curve and the tooth center line (which coincides with a normal $I_R$ to the rim neutral curve). Next, describe the motion of the tooth t of the flexible external gear produced by the wave generator 4 (not shown in FIG. 3) relative to an $O_C$–$x_C$, $y_C$ coordinate system located on a tooth space of the rigid internal gear 2 as motion of the coordinate system $O_F$–$x_F$, $y_F$ relative to the coordinate system $O_C$–$x_C$, $y_C$.

The procedure for determining tooth profile according to the invention will now be explained with reference to FIG. 4. A convex arc a in the figure is first applied as the main portion of the tooth profile of the flexible external gear 3. Then the movement locus $l_C$ of the center A of the convex arc in a space fixed to the rigid internal gear is drawn, this being the most important point of the present invention. Next, the evolute of the movement locus $l_C$ (the locus of the center of curvature at every point of the movement locus) is calculated. The inventor discovered that when, as in this invention, the flexing coefficient is smaller than 1, i.e., in the case of negative deflection, an inflection point H appears in the movement locus of the center of the arc, so that the evolute assumes two branches and the normal to the movement locus passing through the inflection point becomes asymptote z.

When the convex arc tooth profile of the flexible external gear 3 is given radius $\rho_F$, the tooth profile generated at the rigid internal gear 2 is obtained as curve b parallel to the movement locus $l_C$ of the arc center. The inventor discovered that the parallel curve b intersects the asymptote at point I, becomes a concave curve on the deddendum side of point I and a convex curve on the tooth crest side thereof, and has a return point R on the evolute. The invention adopts the parallel curve constituted by the generated curve up to return point R as the tooth profile of the rigid internal gear 2 and defines the range of the convex arc tooth profile of the flexible external gear 3 by adopting as the tooth crest the point of contact with point R at the start of meshing and as the deddendum the point of contact with point R at the end of meshing between the convex tooth profiles (which is also the start of meshing between the convex tooth profile and the concave tooth profile).

Figure 4:
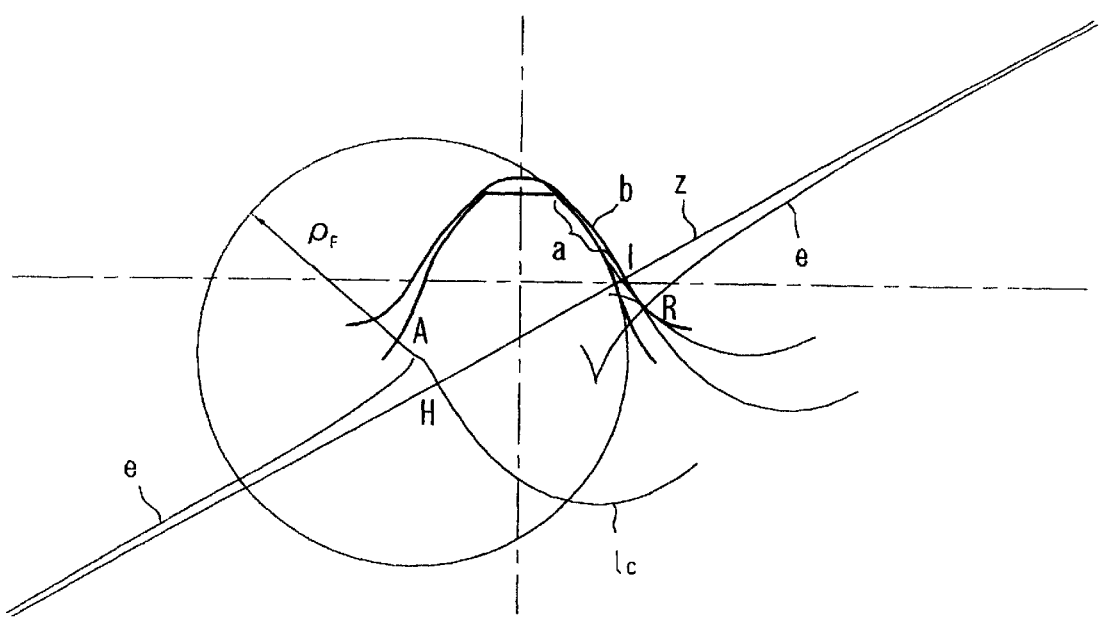
FIG. 4 is a diagram for explaining the tooth profile determining method of the invention.
Figure 5:
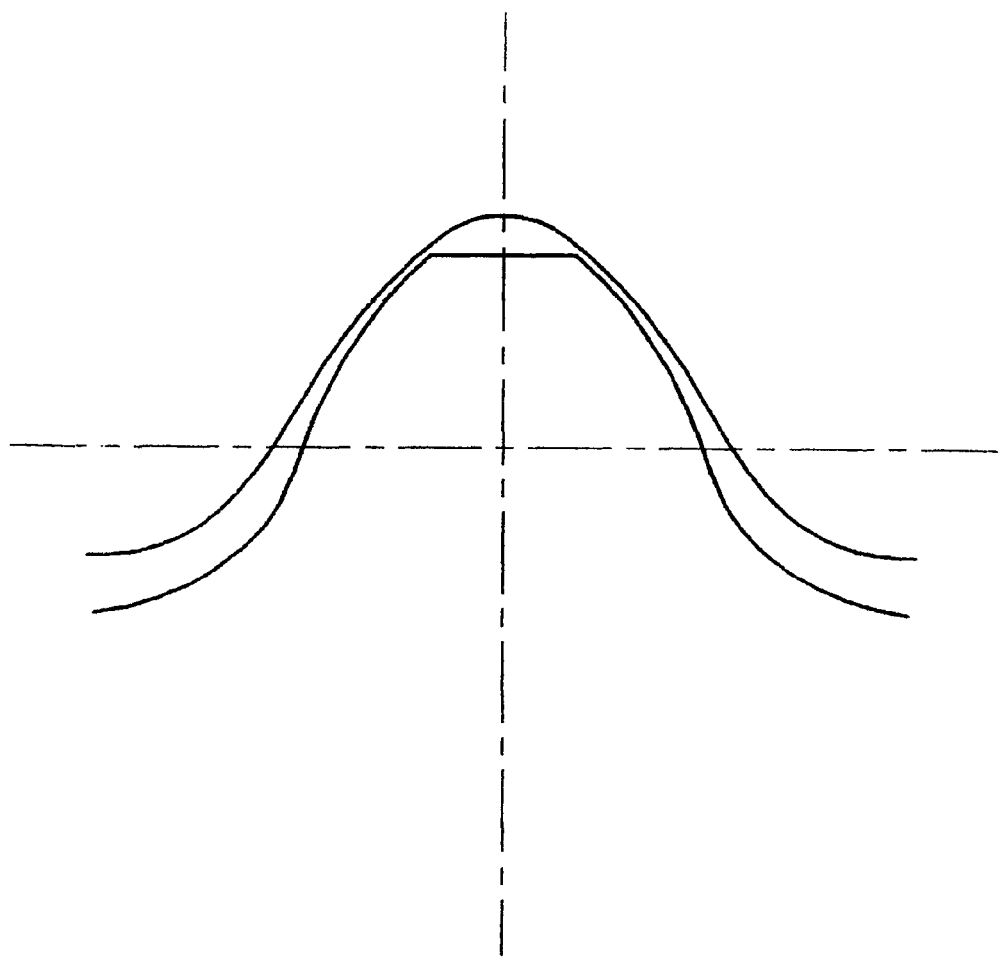
FIG. 5 is a diagram showing an example of a tooth profile according to the invention.
Figure 6:
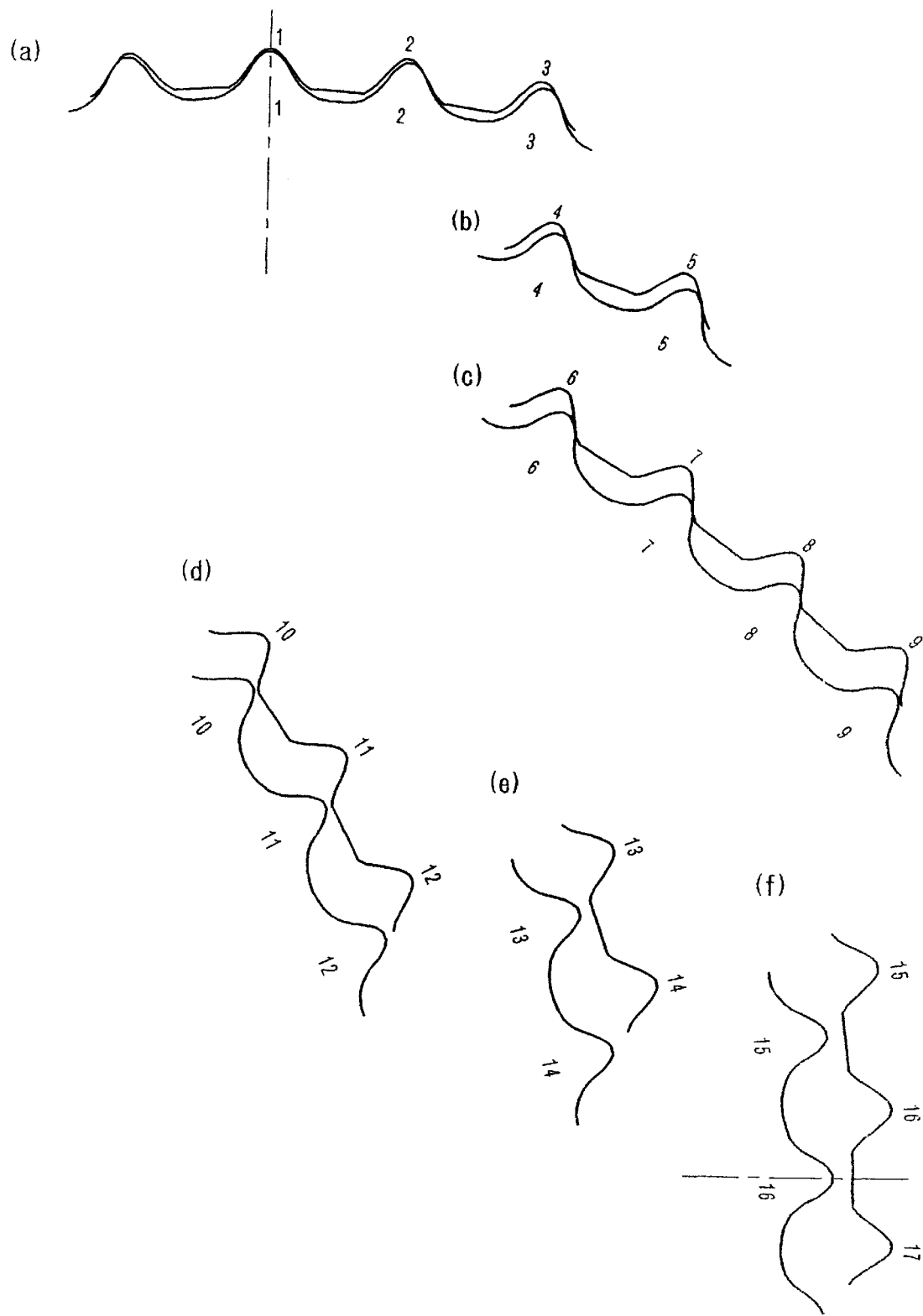
FIG. 6 is a set of diagrams showing an example of tooth profile meshing according to the invention.

FIG. 5 shows an example of a tooth profile obtained by the method of FIG. 4. As shown in the figure, an arcuate addition has been made at the addendum of the rigid internal gear to increase the tooth height while staying within the range of tooth height enabling avoidance of interference with the tooth crest and tooth root of the flexible external gear. This increase in the tooth height is for increasing ratcheting torque.

FIGS. 6(a) to 6(f) show an example of the meshing of the teeth of a flexible meshing type gear device with the tooth profile of FIG. 5, showing how the teeth of the two gears mesh over a 90-degree range from the position of the major axis to the position of the minor axis.

The invention greatly increases the load capacity of the device by adopting chiefly pass meshing of a flexible external gear concave arc profile and a rigid internal gear convex curve tooth profile, and further maximizing the tooth height participating in the meshing. Moreover, as a characteristic of negative deflection, meshing is performed at a place apart from the major axis. The stress produced by meshing therefore appears at a place where bending stress produced by elliptical deformation is reduced, with no superimposition of stress produced by tooth meshing in the vicinity of the major axis where bending stress produced by elliptical deformation of the rim of the flexible external gear is maximum. This also enhances the load capacity of the flexible external gear.

The meshing of the invention tooth profile is principally meshing of a convex tooth profile and a concave tooth profile, and meshing between convex tooth profiles can be eliminated with no adverse consequences.

As the concave curve tooth profile of the rigid internal gear closely resembles the circle of curvature, it is practically possible to replace it with the circle of curvature.

Figure 7:
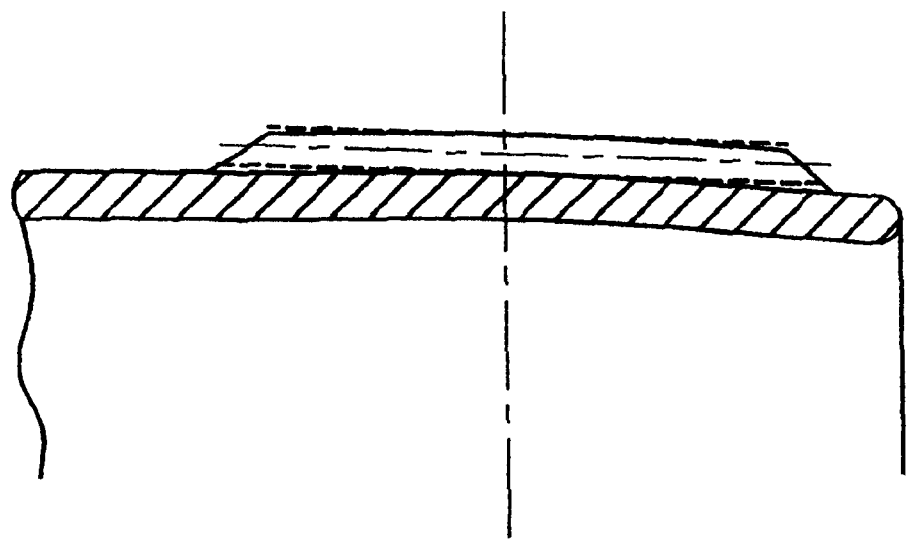
FIG. 7 is a diagram for explaining relieving applied to a tooth.

The foregoing explanation relates to the main cross-section of the flexible external gear. As regards sections apart for the main cross-section in the directions of the opening portion and the diaphragm, relieving is preferable applied as shown in FIG. 7 when necessary for avoiding tooth interference. In the case of a ring-type flexible meshing type gear device, however, relieving is not necessary.

As explained in the foregoing, by adopting negative deflection to space the meshing region away from the major axis, the present invention prevents the bending stress produced in the vicinity of the major axis by the elliptical deformation and the tensile stress produced by tooth meshing from being superimposed in the rim of the flexible external gear. In addition, the invention distributes the ball load of the wave generator away from the vicinity of the major axis and implements meshing of the gears as pass meshing of concave and convex tooth profiles having maximized tooth height as is advantageous from the aspect of surface pressure. The invention therefore markedly enhances the load capacity of the flexible meshing type gear device.

Moreover, the maximization of the tooth height helps to increase ratcheting torque and make the device more reliable in practical applications.

What is claimed is:

1. A flexible meshing gear device comprising:

a rigid internal gear, a flexible external gear and a wave generator, wherein the flexible external gear includes a cylindrical body and external teeth formed on the outer surface of the cylindrical body, the wave generator flexes a cross-section the external gear perpendicular to the gear axis into an elliptical shape to cause the external gear to mesh partially with the rigid internal gear, the rigid internal gear and the flexible external gear are both spur gears of module m, the number of teeth of the flexible external gear is 2n (n being a positive integer) fewer than the number of teeth of the rigid internal gear, and the wave generator is rotated to produce relative rotation between the two gears, which flexible meshing gear device is imparted with maximized tooth height and enabled to effect pass meshing of concave and convex tooth profiles in the main cross-section of the flexible external gear apart from the major axis by:

defining a cross-section of a tooth trace of the flexible external gear perpendicular to the gear axis taken at an arbitrarily selected location as a main cross-section, finding the difference at this main cross-section between the maximum radius of a neutral curve of the elliptical rim after deformation of the flexible external gear and the radius of a rim neutral curve before deformation, dividing the difference by mn, and defining the result as a flexing coefficient of the elliptical rim neutral curve, setting the flexing coefficient at a negative deflection smaller than a reference value of 1 to exclude the vicinity of the major axis of the ellipse from the meshing region of the teeth of the two gears, defining the basic tooth profile of the flexible external gear as a convex arc, applying a concave curve that the convex arc generates in the rigid internal gear as the main portion of the tooth profile of the rigid internal gear, taking the extreme point of the concave curve in the direction of the tooth crest on a normal drawn at the inflection point of the movement locus described by the center of the convex arc tooth profile of the flexible external gear relative to the rigid internal gear, defining the point on the convex arc of the flexible external gear meshing with this extreme point as the extreme point of the convex arc in the direction of the deddendum of the convex arc tooth profile of the flexible external gear, applying the concave curve continuing on from the extreme point in the direction of the deddendum as the deddendum of the flexible external gear, adopting the generated convex curve between the point on the normal drawn at the inflection point of the locus described by the center of the convex arc tooth profile of the flexible external gear and a return point of the generated curve appearing on the evolute of the locus as the tooth profile on the tooth crest side continuing on from the extreme point of the concave tooth profile of the rigid internal gear, adding a convex curve to the generated convex curve without interfering with the flexible external gear, and defining the tooth crest point of the convex arc tooth profile of the flexible external gear as the meshing point with the generated convex curve tooth profile of the rigid internal gear at the return point.

2. A flexible meshing type gear device according to claim 1, wherein the flexible external gear comprises the cylindrical body, an annular diaphragm continuous with one end of the body, an opening portion formed at the other end of the body, and the external teeth capable of meshing with said internal teeth formed on the outer peripheral surface of the body at the opening portion end, the wave generator being adapted to elliptically flex cross-sections of the body of the flexible external gear so that the amount of flexing increases from the diaphragm toward the opening portion approximately in proportion to the distance from the diaphragm, thus partially meshing the external gear with the internal gear.

3. A flexible meshing type gear device according to claim 2, wherein relieving is applied to the teeth from the main cross-section of the flexible external gear toward the opening portion and toward the inner extremity continuing on from the diaphragm of the body.

4. A flexible meshing type gear device according to claim 1, wherein meshing between the convex tooth profile of the rigid internal gear and the convex tooth profile of the flexible external gear is eliminated by imparting clearance to the convex tooth profile of the rigid internal gear on the tooth crest side.

5. A flexible meshing type gear device according to claim 1, wherein the circle of curvature of the tooth profile at a typical point in the meshing region is used to approximate the generated concave tooth profile of the rigid internal gear.

* * * * *